United States Patent
Nakayama

[19]
[11] Patent Number: 6,141,511
[45] Date of Patent: Oct. 31, 2000

[54] FIXING DEVICE FOR USE IN AN IMAGE FORMING APPARATUS THAT HAS FIRST AND SECOND HEATER LAMPS AND FIRST AND SECOND CONTROLLERS

[75] Inventor: Hiroshi Nakayama, Kawasaki, Japan

[73] Assignees: Toshiba Tec Kabushiki Kaisha, Tokyo; Kabushiki Kaisha Toshiba, Kawasaki, both of Japan

[21] Appl. No.: 09/372,683

[22] Filed: Aug. 12, 1999

[30] Foreign Application Priority Data

Aug. 12, 1998 [JP] Japan .................................. 10-228046

[51] Int. Cl.7 .................................................. G03G 15/20
[52] U.S. Cl. ................................................. 399/69; 399/51
[58] Field of Search .................................. 399/67, 69, 70, 399/328, 330, 335, 336, 337, 338, 51, 202

[56] References Cited

U.S. PATENT DOCUMENTS 5,526,103  6/1996  Kato et al. ............................... 355/285
5,809,369  9/1998  Furuya et al. ............................. 399/70

FOREIGN PATENT DOCUMENTS 58-130368   8/1983  Japan .
61-277986  12/1986  Japan .
62-157073   7/1987  Japan .
 2-32374    2/1990  Japan .
 7-261596  10/1995  Japan .

*Primary Examiner*—Quana M. Grainger
*Attorney, Agent, or Firm*—Foley & Lardner

[57] ABSTRACT

A copier having a scanner section and a fixing device. The scanner section has an exposure lamp, and the fixing device has an upper roller and a lower roller. The upper roller incorporates a main heater lamp and a sub-heater lamp. While the scanner section is operating, that is, while the exposure lamp remains on, the sub-heater lamp is off, and only the main heater lamp is on. When the exposure lamp is turned off, the main heater lamp and the sub-heater lamp are turned on, thus maintaining the surface temperature of the upper roller within a predetermined range. The exposure lamp and the sub-heater lamp consume the same current. Hence, the total current consumed in the copier always remains less than.

7 Claims, 5 Drawing Sheets

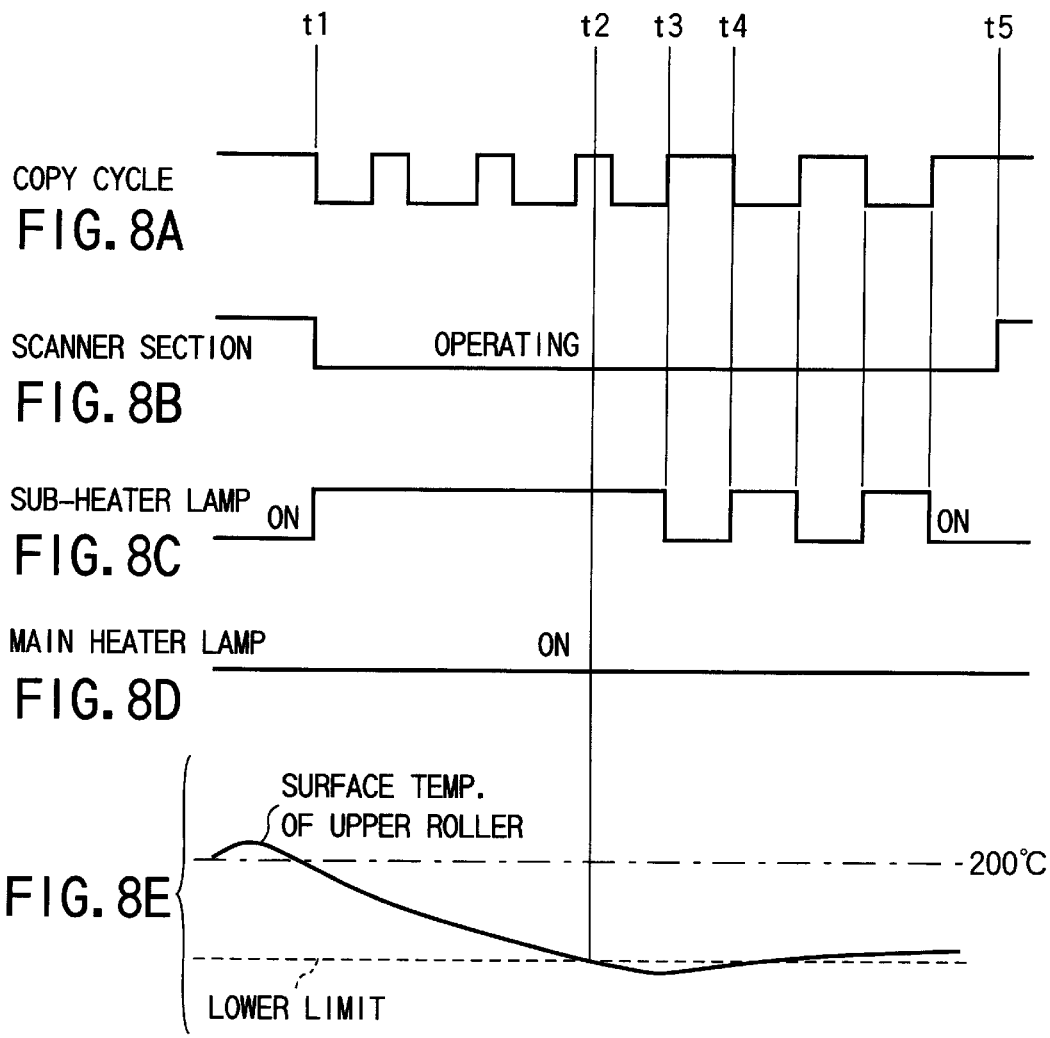

FIXING DEVICE FOR USE IN AN IMAGE FORMING APPARATUS THAT HAS FIRST AND SECOND HEATER LAMPS AND FIRST AND SECOND CONTROLLERS

BACKGROUND OF THE INVENTION

The present invention relates to a method of manufacturing an image forming apparatus that has a scanner for reading images from recording media and a printer for printing the images read by the scanner.

In most conventional copiers, a copy sheet is clamped between the upper (heating) roller and lower (pressing) roller of the fixing device and a toner image is thereby fixed to the copy sheet.

Recently, a copier of new type has been developed, in which the upper roller incorporates two heater lamps to fix a toner image to a copy sheet more reliably in the high-speed copying mode. To operate the two heater lamps and also the exposure lamp provided in the scanner at the same time, currents totaling 15 A or more must be supplied to the heater lamps and exposure lamp. Thus, these lamps will consume great power of 1500 W or more.

There is a demand for a high-speed copier which can operate at a current of less than 15 A and which can yet reliably fix images to copy sheets.

BRIEF SUMMARY OF THE INVENTION

The object of the present invention is to provide an image forming apparatus that always operate at a current of less than 15 A and which can yet reliably fix images to copy sheets.

According to the invention there is provided an image forming apparatus which includes a scanner having an exposure lamp, for reading an image from a document by turning on the exposure lamp, an image-processing section for forming an electrostatic latent image corresponding to the image read by the scanner on a photosensitive drum, developing the electrostatic latent image on the photosensitive drum with toner, thereby forming a toner image, and transferring the toner image to a copy sheet, and a fixing device having a fixing roller incorporating first and second heater lamps, for fixing the toner image on the copy sheet. One of the first and second heater lamps is turned off when the exposure lamp of the scanner is turned on. The first heater lamp and the second heater lamp are turned on after the scanner finishes scanning and reading the document, thereby to maintaining a surface temperature of the fixing roller within a predetermined range.

The scanner is controlled to increase a document-reading cycle of the reading means, when the surface temperature of the fixing roller falls below a lower limit of the predetermined range during a continuous copying operation. In other words, the speed with which the exposure lamp is returned to the initial position is reduced.

The first and second heater lamps are turned on with a predetermined time lag, thereby reducing a rush current. The time lag is substantially 300 ms.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A to 8D are timing charts explaining a second scheme of controlling the heater lamps of the fixing device in the continuous copying mode; and FIG. 8E is a chart, illustrating how the surface temperature of the upper roller changes when the heater lamps are controlled in the second scheme.

DETAILED DESCRIPTION OF THE INVENTION

An embodiment of the present invention will be described with reference to the accompanying drawings.

Figure 1:
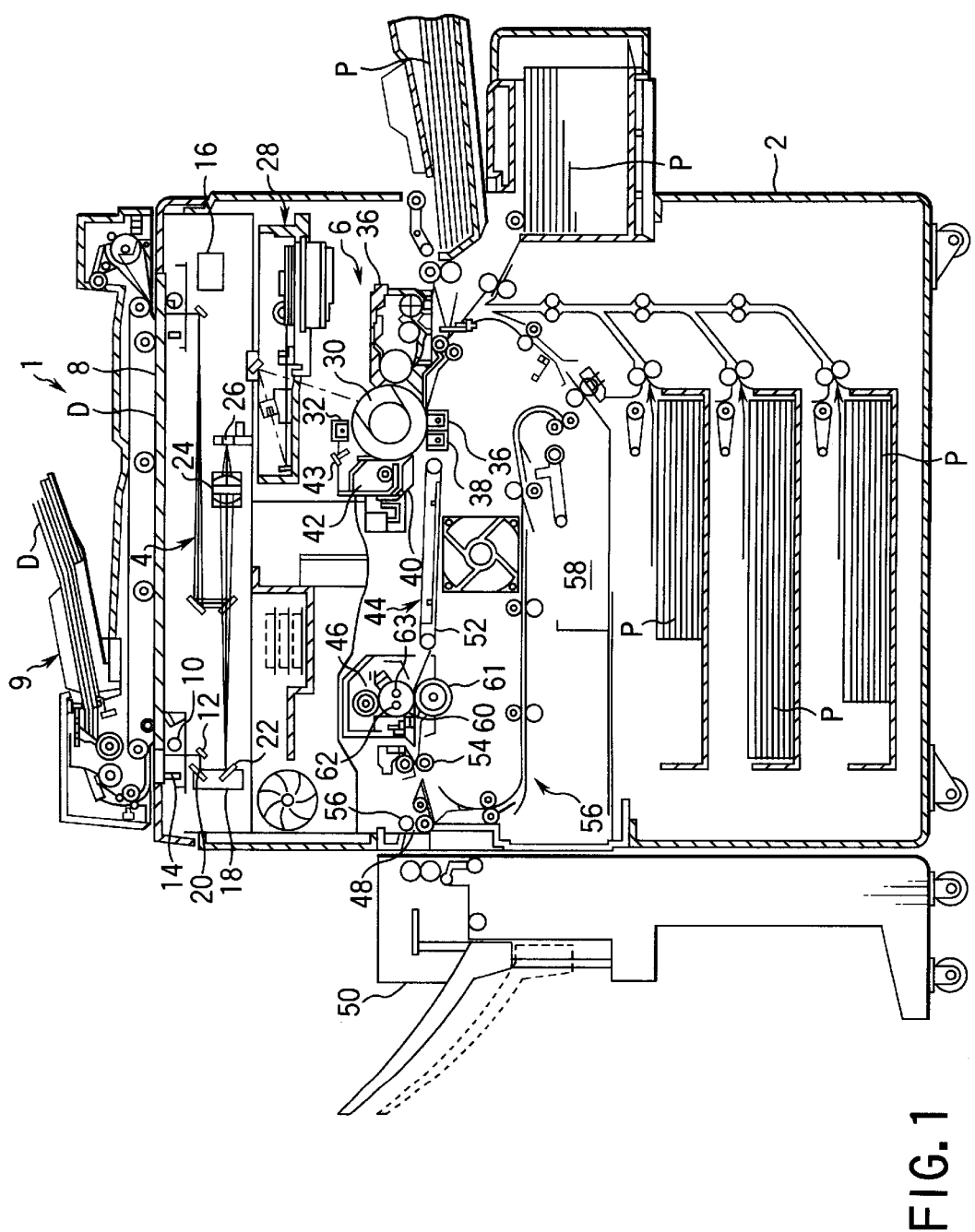
FIG. 1 is a sectional view showing a digital copier according to the present invention.

FIG. 1 is a sectional view showing a digital copier 1, which is an embodiment of the image forming apparatus according to the present invention.

As shown in FIG. 1, the digital copier 1 comprises a housing 2, a scanner section 4, and a printer section 6. The sections 4 and 6 are provided in the housing 2. The scanner section 4 operates as image-reading means. The printer section 6 functions as image-forming means.

A document table 8, which is a transparent glass pate, is provided on the top of the housing 2 to support a document sheet D, from which image data will be read. An automatic document feeder 9 (hereinafter referred to as "ADF") is provided on the top of the housing 2, too, to feed a document sheet D onto the document table 8.

The scanner section 4 has an exposure lamp 10 and a first mirror 12. The exposure lamp 10 is, for example, a halogen lamp, and is provided to illuminate that side of the document sheet D which contacts the document table 8. The first mirror 12 receives the light reflected from that side of the document sheet D and deflects the light in a predetermined direction. Both the exposure lamp 10 and the first mirror 12 are secured to a first carriage 14, which is located below the document table 8.

The first carriage 14 is connected to a toothed belt (not shown), which is driven by a scanner motor 16 (drive motor). The scanner motor 16 is, for example, a stepping motor. The first carriage 14 can be driven back and forth, in parallel to the document table 8.

A second carriage 18 is provided below the document table 8. The second carriage 18 is connected to the toothed belt, like the first carriage 14. The second carriage 18 can therefore be driven in parallel to the document table 8, at half the speed the first carriage 27 is driven. The second carriage 18 holds a second mirror 20 and a third mirror 22. The surfaces of these mirrors 20 and 22 incline to each other at right angles. The second mirror 20 deflects the light deflected by the first mirror 12. The third mirror 22 deflects the light deflected by the second mirror 20.

An image-forming lens 24 and a CCD sensor 26 (line sensor) are arranged blow the document table 8. The image-forming lens 24 focuses the light deflected by the third mirror 20 mounted on the second carriage 18. The image-forming lens 24 can be moved by a drive mechanism (not shown), in a plane containing the axis of the light deflected by the third mirror 20. Thus, the lens 24 can therefore form an image in a desired magnification (in the main scanning direction), on the light-receiving surface of the CCD sensor 26. The CCD sensor receives the light focused by the lens 24 and converts the light into an electric signal, in accordance with the clock signal supplied via a CPU (later described). The magnification in the main scanning direction can be varied by changing the speed with which the first carriage 14 is moved.

The printer section 6 comprises a photosensitive drum 30. The drum 30, which can rotate, is located in the substantially middle part of the housing 2 and used as image carrier. The circumferential surface of the drum 30 will be illuminated with the laser beam emitted form a laser exposure device 28. A main charger 32, a developing device 34, a separation charger 36, a transfer charger 38, separation claws 40, a cleaner 42, and a discharger 43 are arranged in the order mentioned, around the photosensitive drum 30.

The main charger 32 changes the circumferential surface of the drum 30 to a predetermined potential before an electrostatic latent image is formed on the circumferential surface of the drum 30. The developing device 34 applies toner (i.e., developer) to the electrostatic latent image formed on the drum 30, thereby forming a toner image in a desired density. The separation charger 36 is designed to separate a copy sheet P (image-forming medium) from the photosensitive drum 30. The transfer charger 38 is designed to transfer the toner image from the drum 30 to the copy sheet P. The separation claws 40 are provided to separate the copy sheet P from the circumferential surface of the drum 30. The cleaner 42 removes residual toner from the circumferential surface of the drum 30, cleaning the photosensitive drum 30. The discharger 43 is designed to electrostatically discharge the circumferential surface of the drum 30.

Paper cassettes are provided in the lower part of the housing 2, one below another. The paper cassettes can be drawn out of the housing 2. They contain a stack of copy sheets P, each. A large-capacity sheet feeder is removably provided in one side of the housing 2.

A sheet-conveying path 44 is provided in the housing 2. The sheet-conveying path 44 extends from the sheet cassettes and the large-capacity sheet feeder. The path 33 passes through the image transfer section that is located between the photosensitive drum 30 and the transfer charger 38. At the end of the sheet-conveying path 44, a fixing device 46 is arranged. The fixing device 46 opposes a side wall of the housing 2, which has a sheet outlet slot 48. A finisher 50 is provided outside the housing 2 and attached to said side wall, to receive any copy sheet P conveyed outwardly through the sheet outlet slot 48.

In the image transfer section, the developer image, i.e., toner image, is transferred from the photosensitive drum 30 to the copy sheet P. The separation charger 36 and the separation claws 40 cooperate, separating the copy sheet P from the circumferential surface of the drum 30. A conveyor belt 52, which is a component of the sheet-conveying path 44, conveys the copy sheet P to the fixing device 46. The fixing device 46 thermally fixing the developer image on the copy sheet P. A pair of sheet-feeding rollers 54 convey the copy sheet P trough the sheet outlet slot 48. A pair of sheet-ejecting rollers 56 eject the copy sheet P onto the finisher 50.

Figure 2:
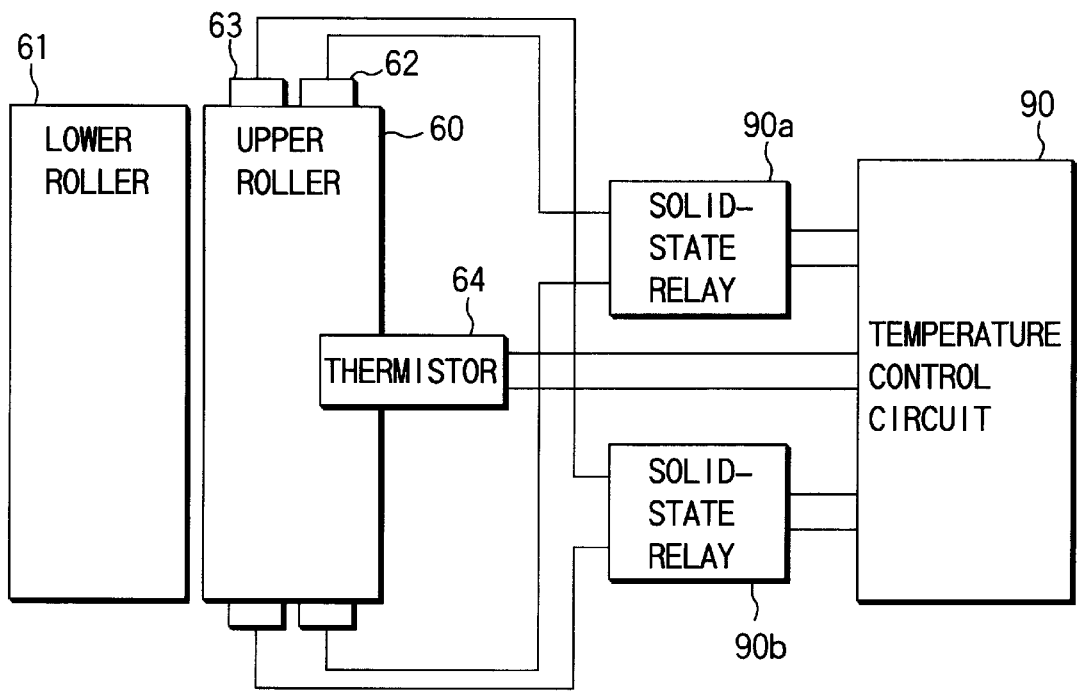
FIG. 2 is a schematic representation of the fixing device incorporated in the digital copier.

As shown in FIG. 2, the fixing device 46 has an upper roller 60 and a lower roller 61. The upper roller 60 incorporates two heater lamps, i.e., a main heater lamp 62 and a sub-heater lamp 63. The lamps 62 and 63 consumes power of 1300 W in total while they remain on. The power the sub-heater lamp 63 consumes is equal to the power the exposure lamp 10 consumes. A thermistor 64 is provided near the upper roller 60, for detecting the surface temperature of the upper roller 60. The main heater lamp 62 and the sub-heater lamp 63 are independently turned on or off by a temperature control circuit 90 (later described). The circuit 90 controls the lamps 62 and 63 in accordance with the temperature detected by the thermistor 64 and the operating state of the scanner section 4.

Both the main heater lamp 62 and the sub-heater lamp 63 remains on as long as the power switch to the digital copier 1 is on. The sub-heater lamp 63 is off, however, while the scanner section 4 is operating with the exposure lamp 10 turned on. As mentioned above, the sub-heater lamp 63 and the exposure lamp 10 of the scanner section 4 consume the same power. Hence, the digital copier consumes a predetermined power or less power, no matter whether the scanner section 4 is operating or not.

Returning to FIG. 1, an automatic sheet-reversing device 58 is provided below the sheet-conveying path 44, for reversing a copy sheet P conveyed from the fixing device 46 and conveying the sheet P back to the sheet-conveying path 44. The finisher 50 staples copies of documents, each consisting of a plurality of coped sheets, and holds the copies stapled.

Figure 3:
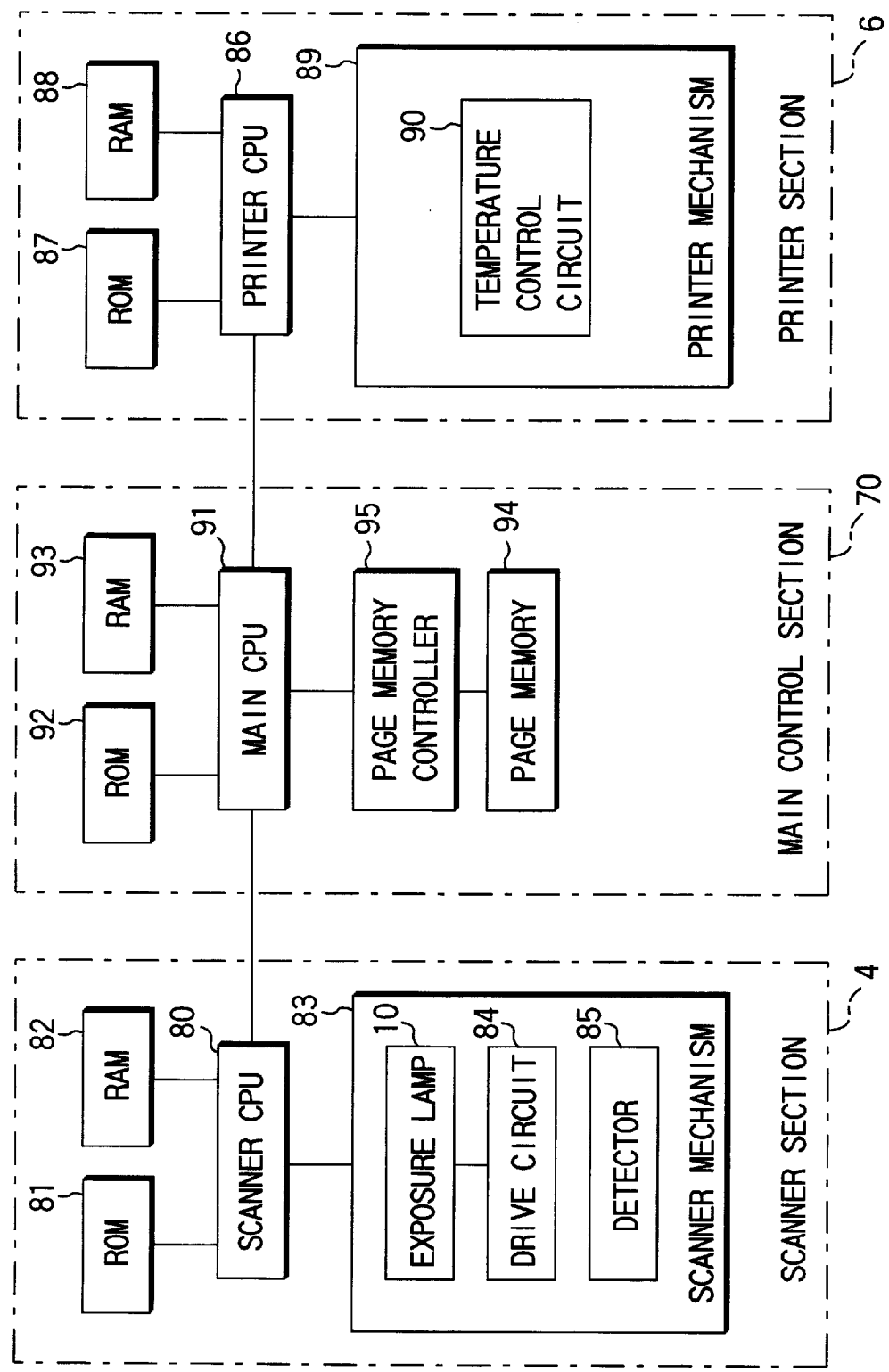
FIG. 3 is a block diagram of the control system provided in the digital copier.

FIG. 3 is a block diagram of the main control section 70 provided in the digital copier 1. Thus, the digital copier 1 comprises the scanner section 4, the printer section 6 and the main control section 70.

The scanner section 4 comprises a scanner CPU 80, a ROM 81, a RAM 82, and a scanner mechanism 83. The CPU 80 controls the other components of the scanner section 4. The ROM 81 stores control programs and the like. The RAM 82 is provided to store data.

The scanner mechanism 83 is controlled by the scanner CPU 80 in accordance with the control program stored in the ROM 81. The scanner mechanism 83 comprises an optical system, a drive mechanism, an image sensor, and an image-correcting section. The optical section includes the exposure lamp 10 and designed to scan the document sheet D and read the data printed thereon. The drive mechanism drives the optical system along the document table 8. The image sensor receives optical image data from the optical system and converts the optical data to an electric image signal. The image-correcting section corrects the electric image signal. The scanner mechanism 83 further comprises a drive circuit 84 and a detector 85. The drive circuit 84 is provided to turn on the exposure lamp 10. The detector 85 detects whether or not a document sheet D is placed on the document table 8.

The printer section 6 comprises a printer CPU 86, a ROM 87, a RAM 88, and a printer mechanism 89. The CPU 86 controls the other components of the printer section 6. The ROM 87 stores control programs and the like. The RAM is provided to store data.

The printer mechanism 89 is controlled by the printer CPU 86 in accordance with the control program stored in the ROM 87. The printer mechanism 89 comprises drive units for driving the photosensitive drum 30, main charger 32, developing device 34, separation charger 36, transfer charger 38, separation claws 40, cleaner 42 and discharger 43, all shown in FIG. 1, and a sheet-conveying section (not shown).

The printer mechanism 89 has the temperature control circuit 90. The temperature control circuit 90 supplies alternating currents to the main heater lamp 62 and the sub-heater lamp 63, both incorporated in the fixing device 46. Supplied with the currents, the lamps 62 and 63 generate heat. The circuit 90 controls the currents supplied to the lamps 62 and 63 in accordance with the operating state of the scanner section 4 and the temperature detected of the drum 30 by the thermistor 64. The circuit 90 controls the main heater lamp 62 and the sub-heater lamp 63, independently of each other, with the assistance of solid-state relays 90*a* and 90*b*.

When the power switch to the digital copier 1 is closed, the control circuit 90 turns on both the main heater lamp 62 and the sub-heater lamp 63. The surface temperature of the upper roller 60 is thereby maintained at a prescribed value. When the scanner section 4 is operated, the sub-heater lamp 63 is turned off, and only the main heater lamp 62 remains on. When the scanner section 4 finishes reading data from the document sheet D, the sub-heater lamp 63 is turned on. Thereafter, both lamps 62 and 63 remains on, controlling the surface temperature of the upper roller 60.

The temperature control circuit 90 turns on both the main heater lamp 62 and the sub-heater lamp 63 when the temperature detected by the thermistor 64 falls to, for example, 198° C. When the temperature detected by the thermistor 64 rises to 202° C., the temperature control circuit 90 turns off both heaters 62 and 63. Hence, the surface temperature of he upper roller 90 is maintained in the range of 198° C. to 202° C. (The intermediate value of this temperature range is 200° C.)

The printer CPU 86 controls the temperature control circuit 90, causing the circuit 90 to turn on the main heater lamp 62 and turn on the sub-heater lamp 63 upon lapse of about 300 ms thereafter. This method suppresses the rush current.

Figure 5:
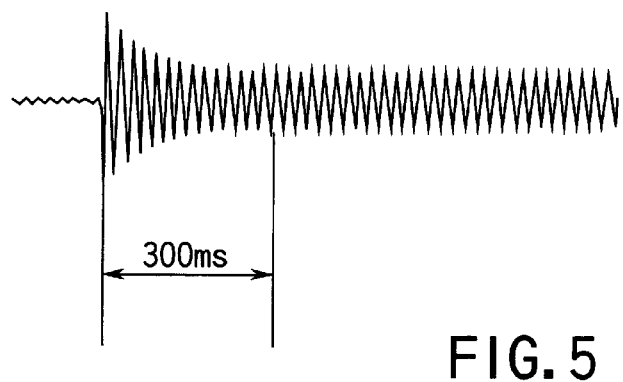
FIG. 5 shows a voltage waveform, illustrating how long the rush current takes to decrease to a constant value.

FIG. 5 shows a voltage waveform equivalent to the rush current. As can be understood from FIG. 5, the rush current takes about 300 ms to decrease to a constant value. Therefore, the instantaneous maximum value of the rush current can be reduced by providing a lag of about 300 ms between the time of turning on the main heater lamp 62 and the time of turning on the sub-heater lamp 63.

The main heater lamp 62 and the sub-heater lamp 63 may be incorporated in a digital copier for use in Europe where the AC 230V power supply is the prevailing commercial power supply. If this is the case, the rush current will amount to about 40 to 50 A when the two lamps 62 and 63 are turned on. Such a large rush current will result in a voltage drop, which may cause the lamps 62 and 63 to flicker. In Europe, the regulations on the flickering of lighting apparatuses have become strict. Hence, a voltage drop resulting from the large rush current should be prevented. In the digital copier 1, the main heater lamp 62 and the sub-heater lamp 63 are turned on at different times as described above. Hence, no large rush current will flow to cause a drop of the power-supply voltage.

As shown in FIG. 3, the main control section 70 comprises a main CPU 91, a ROM (Read Only Memory) 92, a RAM 93, a page memory 94, and a page memory controller 95. The main CPU 91 controls the other components of the section 70. The ROM 92 stores control programs and the like. The RAM 93 is provided to store data temporarily. The page memory 94 can store several pages of compressed image data. The page memory controller 95 is provided to controls the writing of data into the page memory 96 and the reading of data therefrom. The main CPU 91 controls the scanner CUP 80 and the printer CPU 86 in accordance with the control programs stored in the ROM 92.

The main control section 70 further comprises an NVRAM (nonvolatile VRAM), another RAM, and an image-processing section, which are not shown in FIG. 3. The NVRAM is backed up by a battery, and the RAM is used to achieve two-way communication between the main CPU 91 and the printer CPU 86. The image-processing section is designed to process the image data supplied from the scanner section 4, thereby to generate print data.

How the main heater lamp 62 and the sub-heater lamp 63 are controlled in the fixing device 46 will be explained with, reference to the timing chart of FIGS. 6A to 6C and the chart of FIG. 6D that shows how the surface temperature of the upper roller 60 changes with time.

Figure 4:
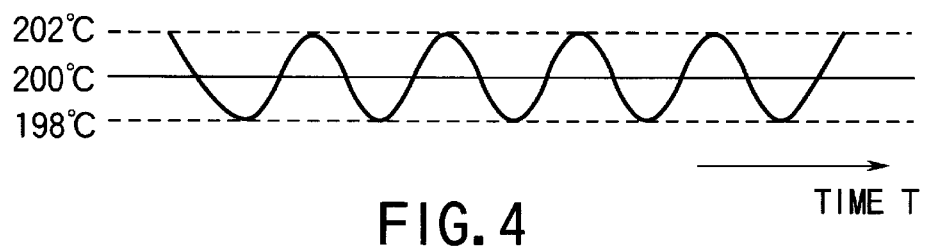
FIG. 4 is a timing chart explaining how the surface temperature of the upper roller of the fixing device is controlled by the temperature control circuit incorporated in the control system.
Figure 6A:
FIGS. 6A to 6C are timing charts explaining how the heater lamps used in the fixing device are controlled.
Figure 6B:
Figure 6C:
Figure 6D:
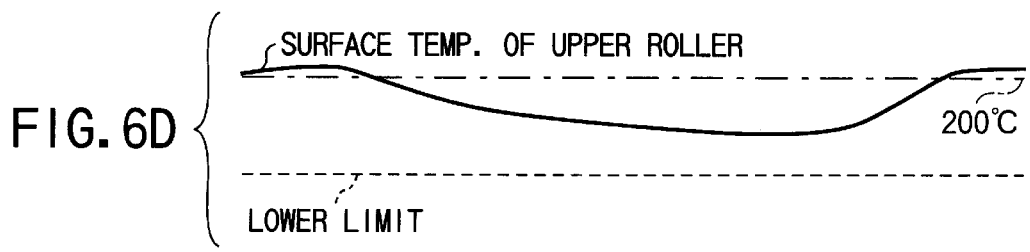
FIG. 6D is a chart showing how the surface temperature of the upper roller changes with time.

FIG. 6A shows how the scanner section 4 is operated to make a copy of a one-sheet document. When the copy start button is pushed at time t1, the scanner section 4 starts reading the one-page document. At this time, the temperature control circuit 90 turns off the sub-heater lamp 63. When the scanner section 4 finishes reading the document at time t2, the temperature control circuit 90 turns on the sub-heater lamp 63, thereby controlling the surface temperature of the upper roller 60. As can be seen from FIGS. 6B and 6C, the main heater lamp 62 always on while the sub-heater lamp 63 remains on. As has been described with reference to FIG. 4, both lamps 62 and 63 are turned on whenever the temperature detected by the thermistor 64 falls to 198° C., and are turned off whenever the temperature detected by the thermistor 64 rises to 202° C. Further, if the copy start button remains not pushed for a predetermined time after time t2, that is, after the scanner section 4 finishes reading the document, the sub-heater lamp 63 is turned off to save electric power.

Figure 7A:
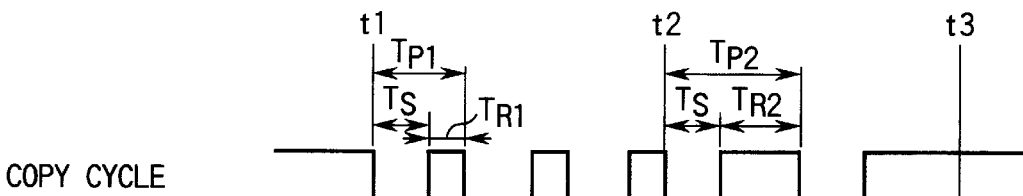
FIGS. 7A to 7D are timing charts explaining a first scheme of controlling the heater lamps of the fixing device in the continuous copying mode.
Figure 7B:
Figure 7C:
Figure 7D:
Figure 7E:
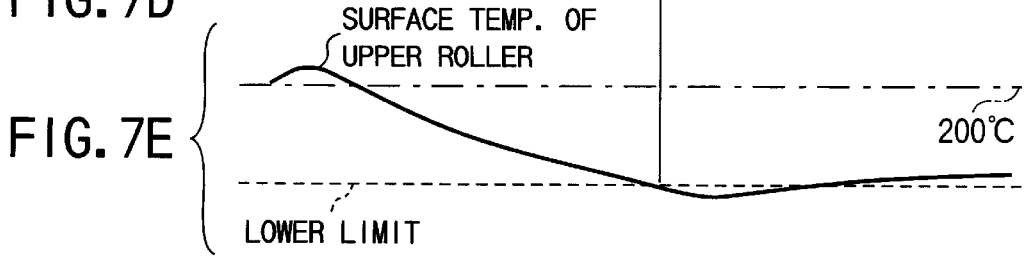
FIG. 7E is a timing chart, illustrating how the surface temperature of the upper roller changes when the heater lamps are controlled in the first scheme.

The scanner section 4 may operate to scan and read several document sheets, one after another. In this case, the main heater lamp 62 and the sub-heater lamp 63 are controlled in the fixing device 46 as will be described below, with reference to the timing chart of FIGS. 7A to 7D and the chart of FIG. 7E showing how the surface temperature of the upper roller 60 changes with time.

When the copy start button is pushed at time t1, the scanner section 4 starts reading the one-page document. At time t1, the temperature control circuit 90 turns off the sub-heater lamp 63. Thereafter, the document sheets are scanned and read, one after another. Each document sheet is scanned and read during a period Ts. That is, the first carriage 14 moves in the sub-scanning direction during the period $T_S$. The first carriage 14 returns to the initial position during a period $T_{R1}$ after scanning and reading each document sheet. The sum of the periods $T_S$ and $T_{R1}$ is the reading cycle $T_{P1}$ of the scanner section 4.

When the temperature detected by the thermistor 64 falls below the lower limit for image fixation at time t2, the printer CPU 86 sets the reading cycle $T_{P1}$ at a greater value $T_{P2}$. (At the same time, the time of feeding the copy sheet to the transfer section is delayed.) More precisely, the CPU 86 decreases the return speed of the first carriage 14 as shown in FIG. 7A, thereby setting the reading cycle $T_{P1}$ at the greater value $T_{P2}$. As a result of this, the temperature detected by the thermistor 64, i.e., the surface temperature of the upper roller 60, rises above the lower limit for image fixation. When the scanner section 4 finishes reading and scanning all document sheets at time t3, the temperature control circuit 90 turns on the sub-temperature lamp 63, whereby the surface temperature of the upper roller is controlled.

That is, the main heater lamp 62 is on and the sub-heater lamp 63 is off, while the scanner section 4 is operating, that is, while the exposure lamp 10 of the section 4 remains on. After the scanner section 4 stops operating, that is, after the exposure lamp 10 is turned off, both the main heater lamp 62 and the sub-heater lamp 63 are on, controlling the temperature of the fixing device 46.

FIGS. 8A to 8D are timing charts explaining another scheme of controlling the lamps 62 and 63 of the fixing device 46 in the continuous copying mode. FIG. 8E is a chart, illustrating how the surface temperature of the upper roller 60 changes when the lamps 62 and 63 are controlled in this scheme. How the lamps 62 and 63 are controlled in this scheme will be explained below.

When the temperature detected by the thermistor 64 falls below the lower limit for image fixation at time t2, the temperature control circuit 90 starts controlling the sub-heater lamp 63. To be more specific, the circuit 90 turns on the sub-heater lamp 63 at time t3 and turns off the sub-heater lamp 63 at time t4, while the first carriage 14 is returning to the initial position. As a result, the reading cycle of the of the scanner section 4 becomes shorter than in the control scheme illustrated in FIGS. 7A to 7E.

As can be seen from FIGS. 6A to 6D, FIGS. 7A to 7E and FIGS. 8A to 8E, the total power consumption of the digital copier 1 can be decreased to less than 15 A, as is desired for use of household electric appliance.

In the present invention, the sub-heater lamp is turned on upon lapse of a specific time after the main heater lamp is turned on, said specific time being the time that the rush current in the main heater lamp takes to decrease to a constant value. More precisely, a lag of about 300 ms between the time of turning on the main heater lamp 62 and the time of turning on the sub-heater lamp 63. Thus, the instantaneous maximum value of the rush current can be much shorter than in the case where both the main heater lamp and the sub-heater lamp are turned on at the same time. An abrupt voltage drop that may result from a rush current can therefore be minimized.

In the present invention, the reading cycle of the scanner section is increased when the surface temperature of the upper roller of the fixing device falls below the preset lower limit while document sheets are being scanned and read one after another. The surface temperature of the upper roller can therefore be maintained at an appropriate value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus a scanner for scanning a document and reading an image from the document;

processing means for forming an electrostatic latent image corresponding to the image read by the scanner on an image-holding body, developing the electrostatic latent image on the image-holding body with toner, thereby forming a toner image, and transferring the toner image to an image-recording medium;

fixing means having a fixing roller incorporating first and second heater lamps, for fixing the toner image on the image-recording medium;

first control means for turning off one of the first and second heater lamps while the scanner is activated; and second control means for turning on both the first heater lamp and the second heater lamp after the scanner stops scanning, thereby maintaining a surface temperature of the fixing roller within a predetermined range, wherein the second control means turns on the first and second heater lamps with a predetermined time lag with the turning on of the second heater lamp lagging the turning on of the first heater lamp, thereby to decrease a rush current, and wherein the predetermined time lag is substantially 300 ms.

2. An image forming apparatus, comprising:

a scanner for scanning a document and reading an image from the document;

processing means for forming an electrostatic latent image corresponding to the image read by the scanner on an image-holding body, developing the electrostatic latent image on the image-holding body with toner, thereby forming a toner image, and transferring the toner image to an image-recording medium;

fixing means having a fixing roller incorporating first and second heater lamps, for fixing the toner image on the image-recording medium;

first control means for turning off one of the first and second heater lamps while the scanner is activated;

second control means for turning on both the first heater lamp and the second heater lamp after the scanner stops scanning, thereby maintaining a surface temperature of the fixing roller within a predetermined range; and third control means for controlling the scanner to increase a document-reading cycle of the scanner when the surface temperature of the fixing roller falls below a lower limit of the predetermined range during a continuous copying operation.

3. An image forming apparatus, comprising:

a scanner for scanning a document and reading an image from the document;

processing means for forming an electrostatic latent image corresponding to the image read by the scanner on an image-holding body, developing the electrostatic latent image on the image-holding body with toner, thereby forming a toner image, and transferring the toner image to an image-recording medium;

fixing means having a fixing roller incorporating first and second heater lamps, for fixing the toner image on the image-recording medium;

first control means for turning off one of the first and second heater lamps while the scanner is activated; and second control means for turning on both the first heater lamp and the second heater lamp after the scanner stops scanning, thereby maintaining a surface temperature of the fixing roller within a predetermined range, wherein the scanner includes:
first drive means for moving an exposure lamp in a sub-scanning direction, and
second drive means for moving the exposure lamp to an initial position in a direction opposite to the subscanning direction, and wherein the image forming apparatus further comprises: third control means for controlling the scanner to decrease a speed with which the exposure lamp is moved to the initial position, when the surface temperature of the fixing roller falls below a lower limit of the predetermined range during a continuous copying operation.

4. An image forming apparatus, comprising:

a scanner for scanning a document and reading an image from the document;

processing means for forming an electrostatic latent image corresponding to the image read by the scanner on an image-holding body, developing the electrostatic latent image on the image-holding body with toner, thereby forming a toner image, and transferring the toner image to an image-recording medium;

fixing means having a fixing roller incorporating first and second heater lamps, for fixing the toner image on the image-recording medium;

first control means for turning off one of the first and second heater lamps while the scanner is activated; and second control means for turning on both the first heater lamp and the second heater lamp after the scanner stops scanning, thereby maintaining a surface temperature of the fixing roller within a predetermined range, wherein the scanner includes:
first drive means for moving an exposure lamp in a sub-scanning direction, and
second drive means for moving the exposure lamp to an initial position in a direction opposite to the sub-scanning direction, and wherein the image forming apparatus further comprises: third control means for controlling the scanner to decrease a speed with which the exposure lamp is moved to the initial position, when the surface temperature of the fixing roller falls below a lower limit of the predetermined range during a continuous copying operation.

5. An image forming apparatus, comprising:

a scanner for scanning a document and reading an image from the document;

processing means for forming an electrostatic latent image corresponding to the image read by the scanner on an image-holding body, developing the electrostatic latent image on the image-holding body with toner, thereby forming a toner image, and transferring the toner image to an image-recording medium;

fixing means having a fixing roller incorporating first and second heater lamps, for fixing the toner image on the image-recording medium;

first control means for turning off one of the first and second heater lamps while the scanner is activated; and second control means for turning on both the first heater lamp and the second heater lamp after the scanner stops scanning, thereby maintaining a surface temperature of the fixing roller within a predetermined range, wherein the second control means repeatedly turns on and off the first and second heater lamps, thereby to maintain the surface temperature of the fixing roller within the predetermined range, and wherein the second control means turns on the first and second heater lamps while an exposure lamp is moving to an initial position when the surface temperature of the fixing roller falls below a lower limit of the predetermined range during a continuous copying operation.

6. A method of operating an image forming apparatus including a scanner for scanning a document and reading an image from the document, a processing section for forming an electrostatic latent image corresponding to the image read by the scanner on an image-holding body, developing the electrostatic latent image on the image-holding body with toner, thereby forming a toner image, and transferring the toner image to an image-recording medium, and a fixing section having a fixing roller incorporating first and second heater lamps, for fixing the toner image on the image-recording medium, said method comprising:

a first control step of turning off one of the first and second heater lamps when the scanner is activated; and a second control step of turning on both the first heater lamp and the second heater lamp after the scanner finishes scanning and reading the document, thereby maintaining a surface temperature of the fixing roller within a predetermined range, wherein the second control step includes a step of turning on the first and second heater lamps with a predetermined time lag with the turning on of the second heater lamp lagging the turning on of the first heater lamp, thereby to decrease a rush current, and wherein the predetermined time lag is substantially 300 ms.

7. A method of operating an image forming apparatus including a scanner for scanning a document and reading an image from the document, a processing section for forming an electrostatic latent image corresponding to the image read by the scanner on an image-holding body, developing the electrostatic latent image on the image-holding body with toner, thereby forming a toner image, and transferring the toner image to an image-recording medium, and a fixing section having a fixing roller incorporating first and second heater lamps, for fixing the toner image on the image-recording medium, said method comprising:

a first control step of turning off one of the first and second heater lamps when the scanner is activated; and a second control step of turning on both the first heater lamp and the second heater lamp after the scanner finishes scanning and reading the document, thereby maintaining a surface temperature of the fixing roller within a predetermined range, wherein the scanner reads the document while an exposure lamp is being moved first in a sub-scanning direction, and then the exposure lamp is being moved to an initial position in a direction opposite to the subscanning direction, and wherein the method further comprises a step of controlling the scanner to decrease a speed with which the exposure lamp is moved to the initial position, when the surface temperature of the fixing roller falls below a lower limit of the predetermined range during a continuous copying operation.

* * * * *